US012563495B2

(12) United States Patent
Ioffe et al.

(10) Patent No.: US 12,563,495 B2
(45) Date of Patent: Feb. 24, 2026

(54) SYSTEMS AND METHODS FOR BROADCASTING A WAKE-UP SIGNAL TO USER EQUIPMENT

(71) Applicant: Apple Inc., Cupertino, CA (US)

(72) Inventors: Anatoliy S Ioffe, Sunnyvale, CA (US);
Alexander Sayenko, Munich (DE);
Camila Priale Olivares, Munich (DE);
Brandy Jo F Sykes, Bath (GB);
Sharad Sambhwani, San Diego, CA
(US)

(73) Assignee: Apple Inc., Cupertino, CA (US)

( * ) Notice: Subject to any disclaimer, the term of this patent is extended or adjusted under 35 U.S.C. 154(b) by 489 days.

(21) Appl. No.: 17/872,957

(22) Filed: Jul. 25, 2022

(65) Prior Publication Data

US 2024/0031933 A1     Jan. 25, 2024

(51) Int. Cl.
*H04W 52/02* (2009.01)
(52) U.S. Cl.
CPC ... *H04W 52/0229* (2013.01); *H04W 52/0235*
(2013.01); *H04W 52/028* (2013.01)
(58) Field of Classification Search
CPC ......... H04W 52/0229; H04W 52/0235; H04W
52/028; H04W 68/025; H04W 52/0216;
H04W 68/02; Y02D 30/70
See application file for complete search history.

(56) References Cited

U.S. PATENT DOCUMENTS

| | | | |
|---|---|---|---|
| 2009/0129306 A1* | 5/2009 | Twitchell, Jr. ........ | H04L 67/145 |
| | | | 370/311 |
| 2019/0320389 A1* | 10/2019 | Alanen ............. | H04W 72/0446 |
| 2019/0364503 A1 | 11/2019 | Kasslin et al. | |
| 2020/0059861 A1 | 2/2020 | Huang et al. | |
| 2020/0280959 A1* | 9/2020 | Sharma ............. | H04W 52/0219 |
| 2021/0044465 A1* | 2/2021 | Sundman .............. | H04J 11/003 |
| 2024/0147370 A1* | 5/2024 | Mahalingam ..... | H04W 52/0219 |

OTHER PUBLICATIONS

Partial Search from PCT Application No. PCT/US2023/026597 dated Oct. 17, 2023; 14 pgs.

* cited by examiner

*Primary Examiner* — Margaret G Webb
(74) *Attorney, Agent, or Firm* — FLETCHER YODER PC

(57) ABSTRACT

A wake-up signal (WUS) network (separate from a cellular network) includes WUS nodes that broadcast WUSs targeting WUS receivers of user equipment (UE). The WUSs may have low frequencies, such as within a television whitespace spectrum. When the cellular network determines that a UE should enter a power saving mode, or when a cellular receiver of the UE enters an idle state, the cellular network may request resources for the UE from a WUS node and activate a WUS receiver of the UE. When the cellular network has data to send to the UE or a threshold time has expired, the cellular network may request a WUS from the WUS network, which broadcasts the WUS that may be received by the UE. If the UE has data to transmit to the cellular network, the cellular network may request that the WUS node stop providing resources to the UE.

20 Claims, 10 Drawing Sheets

PROCESSOR — 12

MEMORY — 14

STORAGE — 16

DISPLAY — 18
— 10

INPUT STRUCTURES — 22

I/O INTERFACE — 24

NETWORK INTERFACE — 26

TRANSCEIVER — 30

POWER SOURCE — 29

12      10      52      30

PROCESSOR        TRANSMITTER 14      56

MEMORY        RECEIVER      54

56

WAKE-UP
RECEIVER 55A        55N

• • •

SYSTEMS AND METHODS FOR BROADCASTING A WAKE-UP SIGNAL TO USER EQUIPMENT

BACKGROUND

The present disclosure relates generally to wireless communication, and more specifically to accommodating power saving techniques employed by user equipment.

User equipment may save power by causing a cellular modem or transceiver to enter a power saving state, such that the cellular modem does not send or receive signals. When it is time to send or receive signals, the user equipment may activate or wake the cellular modem up to enter an operational state. However, there may be complications in waking up the modem to receive signals when the modem is in the power saving state.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, user equipment includes a cellular transmitter, a cellular receiver, a wake-up signal receiver, and processing circuitry communicatively coupled to the cellular transmitter, the cellular receiver, and the wake-up signal receiver. The processing circuitry causes the cellular transmitter to transmit an indication of the wake-up signal receiver to a base station, deactivates the cellular receiver, and activates the wake-up signal receiver. The processing circuitry also causes the wake-up signal receiver to receive a wake-up signal, and activates the cellular receiver and deactivates the wake-up signal receiver based on the wake-up signal. The processing circuitry further causes the cellular receiver to receive a cellular signal from the base station.

In another embodiment, a method includes receiving, at a base station, an indication of a wake-up signal receiver from user equipment, and transmitting, by the base station, a provisioning request for the wake-up signal receiver to a wake-up signal node. The method also includes transmitting, by the base station, a wake-up signal receiver initiation request to the wake-up signal node, wherein the user equipment enters a power saving mode, and receiving, by the base station, an indication that the user equipment has reconnected to the base station based on the user equipment exiting the power saving mode. The method further includes transmitting, by the base station, data to or receiving, by the base station, data from the user equipment.

In yet another embodiment, one or more tangible, non-transitory, machine-readable media store instructions that cause processing circuitry of a wake-up signal node to receive a provisioning request from a base station for user equipment, allocate resources to the user equipment, and receive an initialization request to activate a wake-up signal receiver of the user equipment. The instructions also cause the processing circuitry to broadcast a wake-up signal associated with the user equipment.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figures 1, 2:
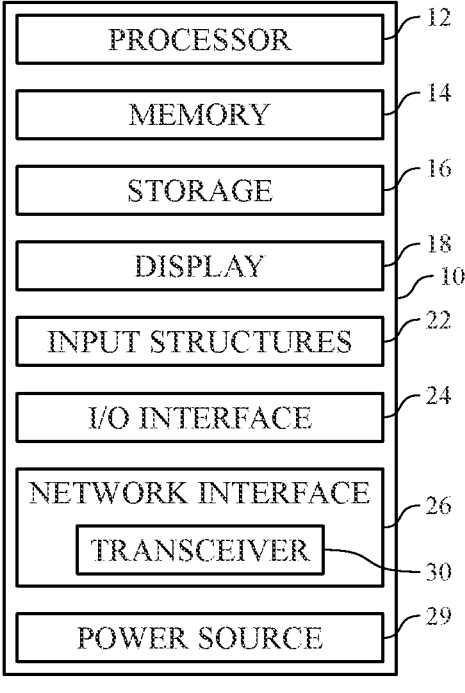
FIG. 1 is a block diagram of user equipment, according to embodiments of the present disclosure.
FIG. 2 is a functional diagram of the user equipment of FIG. 1, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on.

This disclosure is directed to efficient power usage in user equipment. User equipment may continuously or periodically activate a receiver (e.g., a receiver of a cellular modem) to ensure that wireless (e.g., cellular) signals are received. However, this continuous or periodic activation of the receiver may consume excessive power. Instead, the user equipment may include a wake-up or low power receiver that may consume less power than the cellular receiver as it is lower in complexity (e.g., may not demodulate a received signal, may not amplify a received signal, may not filter a received signal, or so on). If the user equipment is not actively receiving a wireless signal, or not receiving a wireless signal for a threshold period of time, the user equipment may cause the receiver to enter a sleep or power-saving mode, or be deactivated (e.g., powered off), and activate the wake-up signal receiver. The wake-up signal receiver may then periodically scan for a wireless wake-up signal sent from a wireless (e.g., cellular) network.

Upon receiving the wake-up signal, the wake-up signal receiver may activate or wake up the cellular receiver, which may begin receiving wireless signals (e.g., cellular signals having user data). The wake-up signal receiver may then enter a sleep or power-saving mode, or be deactivated. However, embedding the wake-up signal in a cellular signal (e.g., having a frequency between 700 megahertz (MHz) and 71 gigahertz (GHz)) may include several drawbacks, such as causing interference with the cellular signal and/or other cellular signals and/or reducing overall spectrum efficiency of a cell or base stations. That is, an increase in traffic of the cell may negatively impact coordination between the wake-up signal receiver and the cell.

The disclosed embodiments include a wake-up signal network (e.g., separate from a cellular network) having wake-up signal nodes that broadcast wake-up signals targeting wake-up signal receivers of user equipment. The wake-up signals may have low frequencies (e.g., 1 gigahertz or less, 800 megahertz (MHz) or less, within a range of 500 MHz to 680 MHz, and so on), such as by using a television whitespace spectrum. The user equipment may maintain two independent cell selection processes: one from the wake-up signal network, and one from the cellular network. If the user equipment is configured to listen to a wake-up signal (e.g., its wake-up receiver is active), then the user equipment may monitor for or be capable of detecting a presence of the wake-up signal network. Depending on the design of the wake-up signal, the user equipment may re-select from one wake-up node to another. If the wake-up network coverage is lost, the user equipment may fallback to a normal cellular network re-selection process (e.g., as provided under cellular technology specifications) and/or send an indication to the cellular network (e.g. through the normal Radio Resource Control (RRC) resume procedure) that it has switched from the mode of listening for a wake-up signal to cellular network paging.

In some embodiments, the cellular network may determine that the user equipment should enter the sleep mode (e.g., due to inactivity of the cellular receiver), and the network (e.g., via a Next Generation NodeB (gNodeB or gNB) base station) may request resources for the user equipment from a wake-up signal node and activate the wake-up signal receiver of the user equipment. In additional or alternative embodiments, when the cellular receiver of the user equipment enters an idle state (e.g., an RRC Idle or Inactive state), the cellular network (e.g., via the gNodeB base station) may request resources for the user equipment from the wake-up signal network (e.g., via the wake-up signal node) and activate the wake-up signal receiver of the user equipment.

In the event that the network has data to send to the user equipment, a threshold time has expired, and so on, the network may request a wake-up signal from the wake-up signal network (e.g., via the wake-up signal node), which broadcasts the wake-up signal that may be received by the user equipment. Similarly, if the user equipment has data (e.g., user data) to transmit to the network, the user equipment may acquire a cell supported by a base station of the network, and the network may request that the wake-up signal node stop providing resources to the user equipment, which may remove such resources. In this manner, the user equipment may cause its cellular receiver to enter a power-saving mode and activate its wake-up signal receiver when it is not actively receiving data, ensuring that the wake-up signal receiver activates its cellular receiver when there is data to send or receive, while saving power.

If the network desires to activate the user equipment (e.g. due to presence of data that is addressed to the user equipment), the corresponding indication to the wake-up network may be sent by different network entities depending on the state of the user equipment. If the user equipment is in an Inactive state (e.g., the user equipment context is in a radio access network (RAN), the RAN may initiate the request to the wake-up network. If the user equipment is in an idle state, then depending on the configuration, it may be either the RAN or a core network sending the corresponding request to the wake-up network. If the core network is involved, then it must be aware that the user equipment is configured with the wake-up mode.

With the foregoing in mind, FIG. 1 is a block diagram of user equipment 10, according to embodiments of the present disclosure. The user equipment 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in the user equipment 10.

By way of example, the user equipment 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be embodied wholly or in part as software, hardware, or both. Furthermore, the processor 12 and other related items in FIG. 1 may be a single contained processing module or may be incorporated wholly or partially within any of the other elements within the user equipment 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the user equipment 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the non-volatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the user equipment 10 to provide various functionalities.

In certain embodiments, the display 18 may facilitate users to view images generated on the user equipment 10. In some embodiments, the display 18 may include a touch screen, which may facilitate user interaction with a user interface of the user equipment 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the user equipment 10 may enable a user to interact with the user equipment 10 (e.g., pressing a button to increase or decrease a volume level). The I/O interface 24 may enable user equipment 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FI®), and/or a wide area network (WAN), such as any standards related to the Third Generation Partnership Project (3GPP), including, for example, a 3$^{rd}$ generation (3G) cellular network, universal mobile telecommunication system (UMTS), 4$^{th}$ generation (4G) cellular network, long term evolution (LTE®) cellular network, long term evolution license assisted access (LTE-LAA) cellular network, 5$^{th}$ generation (5G) cellular network, and/or New Radio (NR) cellular network, a 6$^{th}$ generation (6G) or greater than 6G cellular network, a non-terrestrial network, and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)) and/or any other cellular communication standard release (e.g., Release-16, Release-17, any future releases) that define and/or enable frequency ranges used for wireless communication. The network interface 26 of the user equipment 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

FIG. 2 is a functional diagram of the user equipment 10 of FIG. 1, according to embodiments of the present disclosure. As illustrated, the processor 12, the memory 14, the transceiver 30, a transmitter 52, a receiver 54, a wake-up signal receiver 56, and/or antennas 55 (illustrated as 55A-55N, collectively referred to as an antenna 55) may be communicatively coupled directly or indirectly (e.g., through or via another component, a communication bus, a network) to one another to transmit and/or receive data between one another.

The user equipment 10 may include the transmitter 52 and/or the receiver 54 that respectively enable transmission and reception of data (e.g., user data) between the user equipment 10 and an external device via, for example, a network (e.g., including base stations or access points) or a direct connection. As illustrated, the transmitter 52 and the receiver 54 may be combined into the transceiver 30. The user equipment 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with a one or more beams and various configurations. In some embodiments, multiple antennas of the antennas 55A-55N of an antenna group or module may be communicatively coupled a respective transceiver 30 and each emit radio frequency signals that may constructively and/or destructively combine to form a beam. The user equipment 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means. While the present disclosure refers to the transmitter 52 and/or the receiver 54 as a cellular transmitter and/or cellular receiver, it should be understood that, as discussed above, the transmitter 52 and/or the receiver 54 may additionally or alternatively communicate with any other suitable communication network or device.

The user equipment 10 may include the wake-up signal or low power receiver 56 that, in operation, consumes less power than the receiver 54 as it is lower in complexity (e.g., may not demodulate a received signal, may not amplify a received signal, may not filter a received signal, or so on). That is, the wake-up signal (WUS) receiver 56 may include fewer or less complex components than the receiver 54, such that, in operation, it uses less power than the receiver 54. For example, the wake-up signal receiver 56 may not include a demodulator, an amplifier, a filter, or the like, where the receiver 54 does include such a component. Moreover, the various components of the user equipment 10 may be coupled together by a bus system 58. The bus system 58 may include a data bus, for example, as well as a power bus, a control signal bus, and a status signal bus, in addition to the data bus. The components of the user equipment 10 may be coupled together or accept or provide inputs to each other using some other mechanism.

Figures 3, 4, 5:
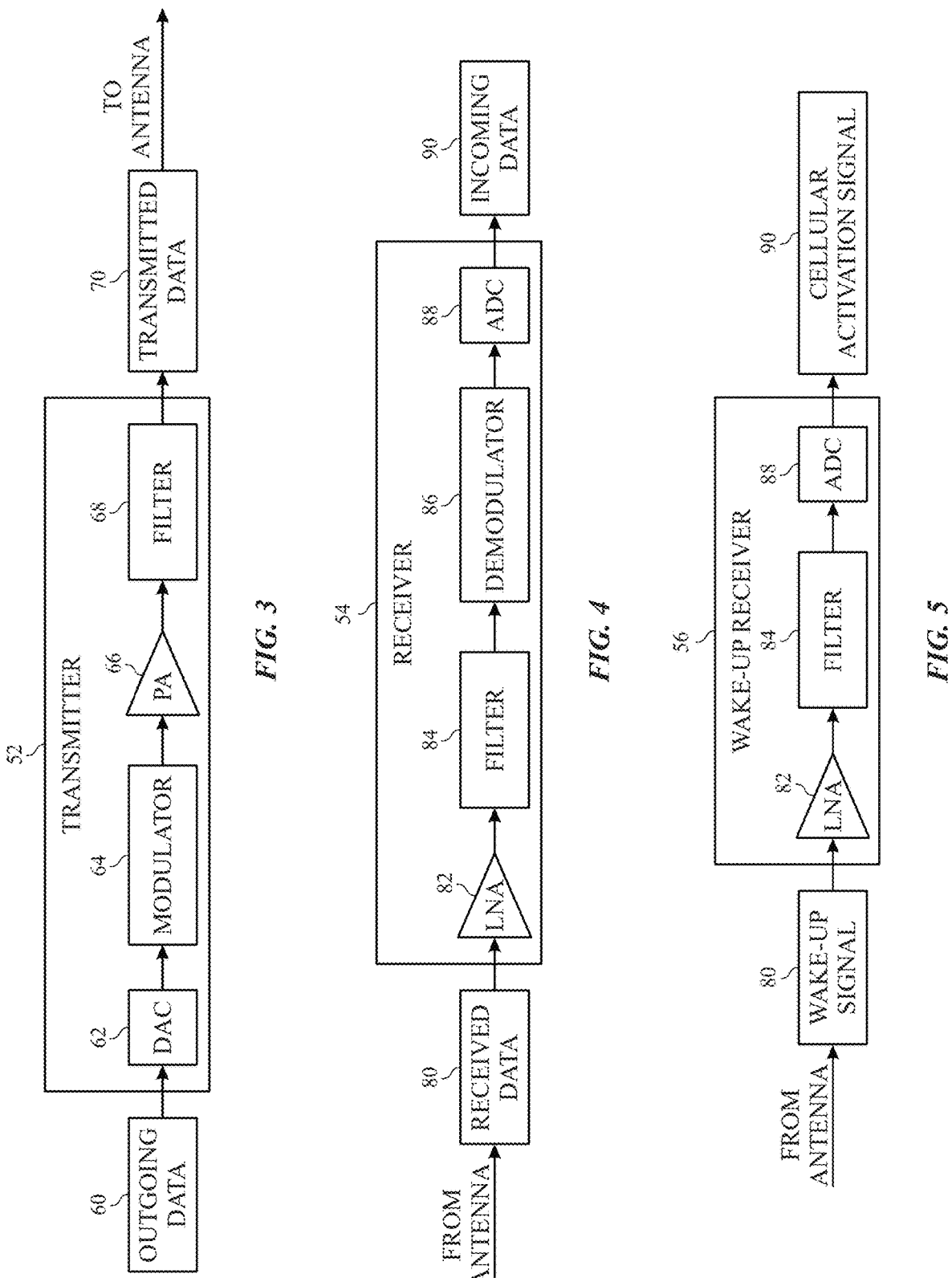
FIG. 3 is a schematic diagram of a transmitter of the user equipment of FIG. 1, according to embodiments of the present disclosure.
FIG. 4 is a schematic diagram of a receiver of the user equipment of FIG. 1, according to y embodiments of the present disclosure.
FIG. 5 is a schematic diagram of a wake-up signal receiver of the user equipment of FIG. 1, according to y embodiments of the present disclosure.

FIG. 3 is a schematic diagram of the transmitter 52 (e.g., transmit circuitry), according to embodiments of the present disclosure. As illustrated, the transmitter 52 may receive outgoing data 60 in the form of a digital signal to be transmitted via the one or more antennas 55. A digital filter 61 (e.g., filter circuitry and/or software) of the transmitter 52 may remove components from the digital signal that are outside of a desired frequency range. In some cases, the digital filter 61 may be tuned to (e.g., filter components outside of) a certain frequency range or fixed step size, such as a radio frequency (RF) channel bandwidth (e.g., 5 MHz, 10 MHz, and so on). In other cases, the digital filter 61 may be tuned to any allocable bandwidth (e.g., 1 MHz or less, 5 MHz or less, 10 MHz or less, and so on). The digital filter 61 may include any suitable filter that performs digital signal processing, including, for example, a linear filter, a causal filter, a time-invariant filter, a stable filter, a finite impulse response (FIR) filter, and so on. A digital-to-analog converter (DAC) 62 of the transmitter 52 may convert the digital signal to an analog signal, and a modulator 64 may combine the converted analog signal with a carrier signal to generate a radio wave. A power amplifier (PA) 66 receives the modulated signal from the modulator 64. The power amplifier 66 may amplify the modulated signal to a suitable level to drive transmission of the signal via the one or more antennas 55. An analog filter 68 (e.g., filter circuitry and/or software) of the transmitter 52 may then remove undesirable noise from the amplified signal to generate transmitted signal 70 to be transmitted via the one or more antennas 55. The analog filter 68 may include any suitable filter or filters to remove the undesirable noise from the amplified signal, such as a bandpass filter, a bandstop filter, a low pass filter, a high pass filter, and/or a decimation filter. Additionally, the transmitter 52 may include any suitable additional components not shown, or may not include certain of the illustrated components, such that the transmitter 52 may transmit the outgoing data 60 via the one or more antennas 55. For example, the transmitter 52 may include a mixer and/or a digital up converter. As another example, the transmitter 52 may not include the analog filter 68 if the power amplifier 66 outputs the amplified signal in or approximately in a desired frequency range (such that filtering of the amplified signal may be unnecessary).

FIG. 4 is a schematic diagram of the receiver 54 (e.g., receive circuitry), according to embodiments of the present disclosure. As illustrated, the receiver 54 may receive received signal 80 from the one or more antennas 55 in the form of an analog signal. A low noise amplifier (LNA) 82 may amplify the received analog signal to a suitable level for the receiver 54 to process. An analog filter 84 (e.g., filter circuitry and/or software) may remove undesired noise from the received signal, such as cross-channel interference. The analog filter 84 may also remove additional signals received by the one or more antennas that are at frequencies other than the desired signal. The analog filter 84 may include any suitable filter or filters to remove the undesired noise or signals from the received signal, such as a bandpass filter, a bandstop filter, a low pass filter, a high pass filter, and/or a decimation filter. A demodulator 86 may remove a radio frequency envelope and/or extract a demodulated signal from the filtered signal for processing. An analog-to-digital converter (ADC) 88 may receive the demodulated analog signal and convert the signal to a digital signal. A digital filter 89 (e.g., filter circuitry and/or software) of the receiver 54 may remove components from the digital signal that are outside of a desired frequency range to generate incoming data to be further processed by the user equipment 10. In some cases, the digital filter 89 may be tuned to (e.g., filter components outside of) a certain frequency range or fixed step size, such as an RF channel bandwidth (e.g., 5 MHz, 10 MHz, and so on). In other cases, the digital filter 89 may be tuned to any allocable bandwidth (e.g., 1 MHz or less, 5 MHz or less, 10 MHz or less, and so on). The digital filter 89 may include any suitable filter that performs digital signal processing, including, for example, a linear filter, a causal filter, a time-invariant filter, a stable filter, a finite impulse response (FIR) filter, and so on. Additionally, the receiver 54 may include any suitable additional components not shown, or may not include certain of the illustrated components, such that the receiver 54 may receive the received signal 80 via the one or more antennas 55. For example, the receiver 54 may include a mixer and/or a digital down converter.

FIG. 5 is a schematic diagram of the wake-up signal receiver 56 (e.g., wake-up signal receive circuitry), according to embodiments of the present disclosure. As illustrated, the wake-up signal receiver 56 may receive a wake-up signal 100 from the one or more antennas 55 in the form of an analog signal. It should be understood that the one or more antennas 55 may be the same, different, or overlap with the one or more antennas 55 from which the receiver 54 received the received signal 80 and/or with which the transmitter 52 transmitted the transmitted signal 70. A low noise amplifier (LNA) 82 may amplify the received analog signal to a suitable level for the wake-up signal receiver 56 to process. An analog filter 84 (e.g., filter circuitry and/or software) may remove undesired noise from the received signal, such as cross-channel interference. The analog filter 84 may also remove additional signals received by the one or more antennas 55 that are at frequencies other than the desired signal. The analog filter 84 may include any suitable filter or filters to remove the undesired noise or signals from the received signal, such as a bandpass filter, a bandstop filter, a low pass filter, a high pass filter, and/or a decimation filter. An analog-to-digital converter (ADC) 88 may receive the filtered analog signal and convert the signal to a digital signal that causes the processor 12 of the user equipment 10 to activate or power on the receiver 54 (e.g., a cellular activation signal 101). Additionally, the wake-up signal receiver 56 may include any suitable additional components not shown, or may not include certain of the illustrated components, such that the wake-up signal receiver 56 may receive the wake-up signal 100 via the one or more antennas 55. For example, the wake-up signal receiver 56 may include a demodulator, a mixer, and/or a digital down converter. As another example, the wake-up signal receiver 56 may not include the LNA 82, the analog filter 84, and/or the ADC 88.

The wake-up signal receiver 56 includes a low complexity radio that receives a device-specific (e.g., to the user equipment 10) wake-up signal 100, thereby initiating a transition of the receiver 54 (e.g., a cellular modem) from a power save mode to an active state (e.g., to receive a network paging message, to receive and respond to a network command, to receive data, and so on). The wake-up signal receiver 56 enables saving power by avoiding waking up or activating the receiver 54 and its corresponding baseband functionality/components. For the wake-up signal receiver 56 to be lower complexity, the wake-up signal 100 may include a narrow bandwidth, such as 300 kilohertz (kHz) or less, 100 kHz or less, 50 kHz or less, kHz or less, 15 kHz or less, and so on. The wake-up signal 100 may also encode a device-specific identity without modulation, enable detection based on a power threshold, have a relaxed multi-user coexistence, a relaxed timing/processing timeline, have a signal power level and sensitivity requirement, and so on.

Figure 6:
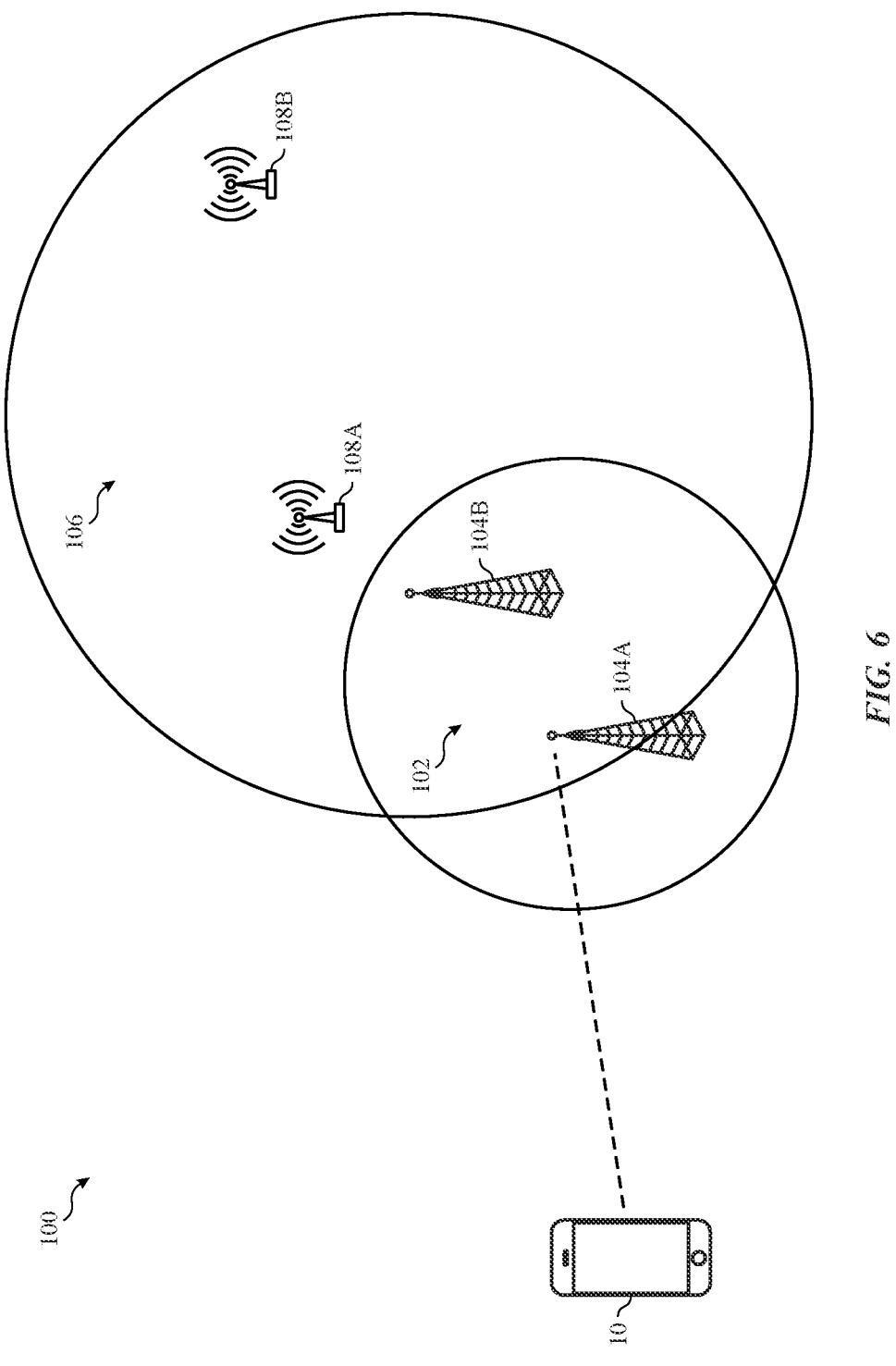
FIG. 6 is a schematic diagram of a communication system including the user equipment of FIG. 1 communicatively coupled to a wireless communication (e.g., cellular) network supported by base stations and a wake-up signal network supported by wake-up signal nodes, according to embodiments of the present disclosure.

FIG. 6 is a schematic diagram of a communication system 102 including the user equipment of FIG. 1 communicatively coupled to a wireless communication network 103 (e.g., a cellular or mobile broadband network) supported by base stations 104A, 104B (collectively 104) and a wake-up signal network 106 supported by wake-up signal nodes 108A, 108B (collectively 108), according to embodiments of the present disclosure. In particular, the base stations 104 may include Next Generation NodeB (gNodeB or gNB) base stations and may provide 5G/NR coverage via the wireless communication network 103 to the user equipment 10. The base stations 104 may include any suitable electronic device, such as a communication hub or node, that facilitates, supports, and/or implements the network 103. In some embodiments, the base stations 104 may include Evolved NodeB (eNodeB) base stations and may provide 4G/LTE coverage via the wireless communication network 103 to the user equipment 10. Each of the base stations 104 may include at least some of the components of the user equipment 10 shown in FIGS. 1 and 2, including one or more processors 12, the memory 14, the storage 16, the transceiver 30, the transmitter 52, the receiver 54, and the associated circuitry shown in FIG. 4. It should be understood that while the present disclosure may use 5G/NR as an example specification or standard, the embodiments disclosed herein may apply to other suitable specifications or standards (e.g., such as the 4G/LTE specification). Moreover, the network 103 may include any suitable number of base stations 104 (e.g., one or more base stations 104, four or more base stations 104, ten or more base stations 104, and so on).

The wake-up signal network 106 may operate independently of and/or overlay or cover, at least in part, the same geographical areas as the network 103. The cellular network 103 and the wake-up signal network 106 may be operated by the same or different operators. In some embodiments, interconnections between the two networks 103, 106 may enable a cellular operator to send a wake-up signal 100 to the user equipment 10 (e.g., according to defined configurations).

If the wake-up signal network 106 and the cellular network 103 do not share the same operator, then a mechanism for the user equipment 10 to fallback to either another wake-up signal carrier (e.g., of the wake-up signal network 106) or to cellular paging (e.g., of the cellular network 103) if the user equipment 10 loses wake-up signal network 106 coverage may be implemented. The user equipment 10 may maintain two independent cell re-selection processes: one for the wake-up signal layer and for the cellular layer. Once configured with a wake-up signal channel, the user equipment 10 may maintain signal strength metrics (e.g., measurements), the user equipment 10 may be configured with additional wake-up signal channels to monitor in order to enable mobility over the wake-up signal layer, and the cellular network 103 may allocate resources for the user equipment 10 to report wake-up signal layer measurements (e.g., signal strength, signal quality, and so on). Mobility across the wake-up signal nodes 108 may be defined based on a re-selection threshold of the wake-up signal nodes 108 by the user equipment 10. For example, a wake-up signal node 108 re-selection threshold may be defined based on signal strength (e.g., Reference Signal Receiver Power (RSRP)) of a currently configured wake-up signal channel. That is, if the signal strength of the currently configured wake-up signal channel is less than the re-selection threshold, then a re-selection process may be performed by the user equipment 10. For example, if the user equipment is in sleep mode (e.g., the wake-up signal receiver 56 is active), and if the wake-up signal node 108 re-selection threshold is triggered (e.g., the signal strength of the currently configured wake-up signal channel is less than the re-selection threshold), then the user equipment 10 (e.g., the cellular receiver 54) may wake up to receive cellular paging (e.g., from the cellular network 103), or to transmit a wake-up signal node 108 re-selection event (e.g. via a Media Access Control (MAC) header bit) and subsequently receive a new wake-up signal configuration (e.g., from a new wake-up signal node 108).

In some embodiments, if the user equipment 10 is configured to listen to a wake-up signal 100 (e.g., its wake-up signal receiver 56 is active), then the user equipment 10 may monitor for or be capable of detecting a presence of the wake-up signal network 106. Depending on the design of the wake-up signal, 100 the user equipment 10 may re-select from one wake-up node 108 to another. For example, the user equipment 10 may select a first wake-up signal node 108 for coverage of the wake-up signal network 106, determine that the coverage of the wake-up signal network 106 provided by the first wake-up signal node 108 is lost, and select a second wake-up signal node 108 for the coverage of the wake-up signal network 106. As such, the user equipment 10 may receive the wake-up signal 100 from the second wake-up signal node 108.

If the wake-up signal network 106 coverage is lost, the user equipment 10 may fallback to a normal cellular network 103 re-selection process (e.g., as provided under cellular technology specifications) or paging and/or send an indication to the cellular network 103 (e.g. through the normal Radio Resource Control (RRC) resume procedure) that it has switched from the mode of listening for a wake-up signal 100 to cellular network paging (e.g., listening to cellular signals using its cellular receiver 54). For example, the user equipment 10 may select a wake-up signal node 108 for coverage of the wake-up signal network 106, determine that the coverage of the wake-up signal network 106 provided by the wake-up signal node 108 is lost, activate the cellular receiver 54 and deactivate the wake-up signal receiver 56 based on the coverage of the wake-up signal network 106 provided by the wake-up signal node 108 being lost, and cause the cellular receiver 54 to receive a cellular signal from a base station 104 (e.g., cellular network paging signals) or cause the cellular transmitter 52 to transmit a cellular signal to a base station 104 (indicating to the cellular network 103 (e.g. through the RRC resume procedure) that it has switched from the mode of listening for the wake-up signal 100 to cellular network paging.

Figure 7:
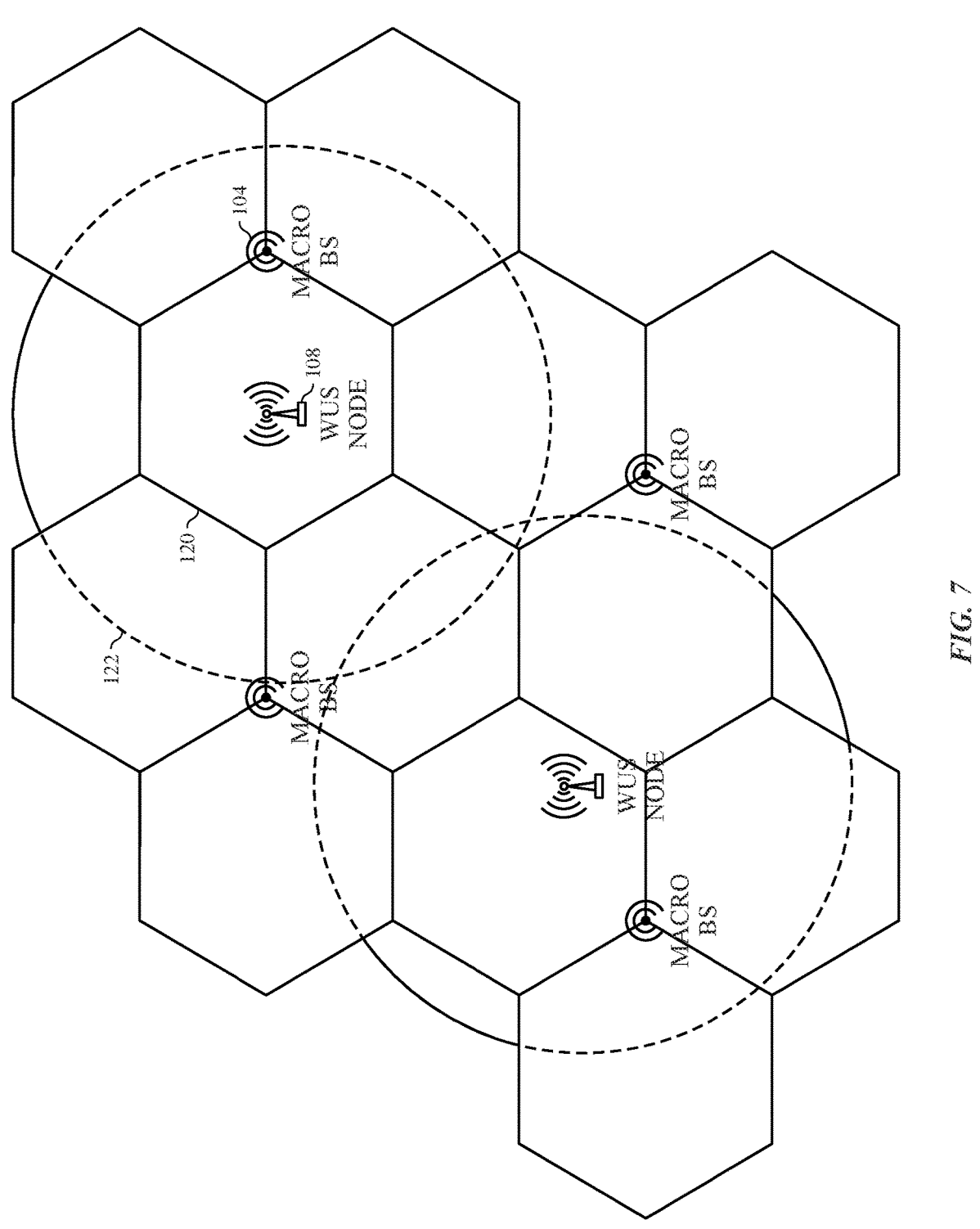
FIG. 7 is a schematic diagram of cells of the base stations of the cellular network and cells of the wake-up signal nodes of the wake-up signal network of FIG. 6, according to embodiments of the present disclosure.

Additionally, the wake-up signal network 106, via the wake-up signal nodes 108, may operate on a low frequency spectrum (e.g., 1 gigahertz or less, 800 megahertz (MHz) or less, within a range of 500 MHz to 680 MHz, and so on). As such, the range of coverage (e.g., of a cell of) each wake-up signal node 108 may, in some embodiments, greater than that of a base station 104. For example, as shown in FIG. 7, a schematic diagram of coverage areas or cells 120 of the base stations 104 of the network 103 and coverage areas or cells 122 of the wake-up signal nodes 108 of the wake-up signal network 106, it may be observed that the cells 122 of the wake-up signal nodes 108 are greater in coverage than the cells 120 of the base stations 104. In particular, each base station 104 provides network services (e.g., connectivity) to each (e.g., of the three) cells 120 that it touches, while each wake-up signal node 108 provides network services (e.g., connectivity) to each cell 122 of which it is a center.

While embedding the wake-up signal 100 in cellular signals (e.g., the received signal 80 of FIG. 4) is possible, the wake-up signal 100 may cause undesired interference with a cellular signal. For example, the wake-up signal 100 may become an in-channel blocker of constant amplitude. Moreover, the wake-up signal 100 may reduce an overall spectrum efficiency of a cell 120, and any coordination between a wake-up signal 100 and downlink/uplink cellular traffic (e.g., including the transmitted signal 70 of FIG. 3 and the received signal 80) may reduce the efficiency further. As such, it may be advantageous to avoid frequency ranges used for cellular communications (e.g., certain frequency ranges within 400 MHz to 71 GHz).

Accordingly, the present disclosure includes dedicating a spectrum to the wake-up signal 100, thereby enabling a low complexity receiving solution and avoiding reducing the spectral efficiency of cellular communications by not configuring the wake-up signal 100 in-channel with desired data. Practically, a licensed spectrum may be reused for broadcast operation. In some embodiments, the wake-up signal 100 may be broadcast on channels of television whitespaces (e.g., frequency ranges, including guard bands, in between television channels). For example, television channels 19 through 36 span a frequency range of 500 MHz to 608 MHz. Each television channel is 6 MHz wide with a 0.309 MHz guard band on each side (e.g., to prevent interference between television channels). In total, there is 11.14 MHz available in this guard band spectrum. The Federal Communications Commission (FCC) ruled (in FCC-19-24A1_Rcd) that the FCC's Part 15 rules allow unlicensed whitespace devices to operate at locations where frequencies are not used by licensed services. In particular, the FCC authorized operation of unlicensed devices in unused channels of broadcast television spectrum, in the guard band between television spectrum and 600 MHz downlink services, in the guard band between the 600 MHz service band uplinks and downlinks (e.g., the 600 MHz duplex gap), and television channel 37. As such, it is contemplated that any of these authorized whitespaces may be used to for broadcasting the wake-up signal 100.

Figure 8:
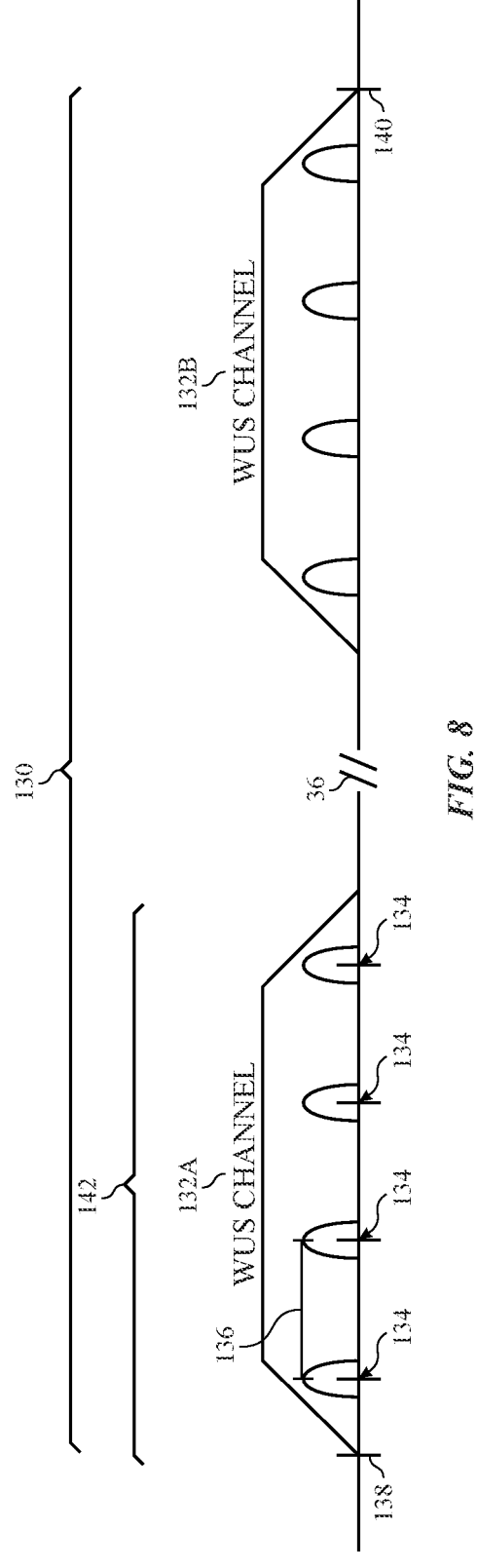
FIG. 8 is a frequency diagram of wake-up signal channelization of a wake-up signal frequency band, according to embodiments of the present disclosure.

FIG. 8 is a frequency diagram of wake-up signal channelization of a wake-up signal frequency band 130, according to embodiments of the present disclosure. The wake-up signal band 130 may correspond to a frequency span allocated by regulation for terrestrial broadcast operation. For example, the wake-up signal band 130 may include the television whitespace spectrum between 500 MHz to 608 MHz. The wake-up signal band 130 may include multiple wake-up signal channels 132A, 132B (collectively 132), of which two are illustrated. Each wake-up signal channel 132 may correspond to a grouping of multiple wake-up signal resources allocated to different user equipment 10 within the wake-up signal band 130. In particular, each wake-up signal channel 132 may include multiple wake-up signal raster points 134, which may correspond to a frequency used by a wake-up signal 100 associated with a specific user equipment 10. The wake-up signal raster points 134 may be defined in a specification (e.g., 3GPP specification or ITU agreement) or by configuration (e.g., of the wake-up signal network 106 and/or the user equipment 10). When defined by configuration, the wake-up signal raster points 134 may also be set based on a user equipment capability indicating a preferred raster density (e.g., frequency difference 136 between wake-up signal raster points 134).

As an example, if the wake-up signal band 130 includes the television whitespace spectrum between 500 MHz to 608 MHz, then a beginning 138 of the wake-up signal band 130 may be set at 500 MHz, and an end 140 of the wake-up signal band 130 may be set at 608 MHz. Each wake-up signal channel 142 bandwidth may be of any suitable bandwidth less than that of the wake-up signal band 130, such as 50 MHz or less, 30 MHz or less, 10 MHz or less, 1 MHz or less, 600 kHz or less, 500 kHz or less, 100 kHz or less, and so on. The frequency difference 136 between wake-up signal raster points 134 may be any suitable frequency difference less than that of the Each wake-up signal channel bandwidth 142, such as 1 MHz or less, 500 kHz or less, 300 kHz or less, 100 kHz or less, 50 kHz or less, 30 kHz or less, 10 kHz or less, and so on).

As each wake-up signal channel 132 may be disposed within guard bands of between television channels, a television channel may be disposed at a frequency region 144 between the wake-up signal channels 132. As exemplified by the sparse comb-like availability of guard bands in the television whitespace spectrum, the wake-up signal channels 132 may be distributed across multiple narrow frequency bands in the frequency domain (e.g., the wake-up signal band 130). The wake-up signal band 130 may be defined to span a large number of these narrow bands, with the wake-up signal channels 132 specified in frequency sub-ranges of the wake-up signal band 130 as allowed or applicable.

Figure 9:
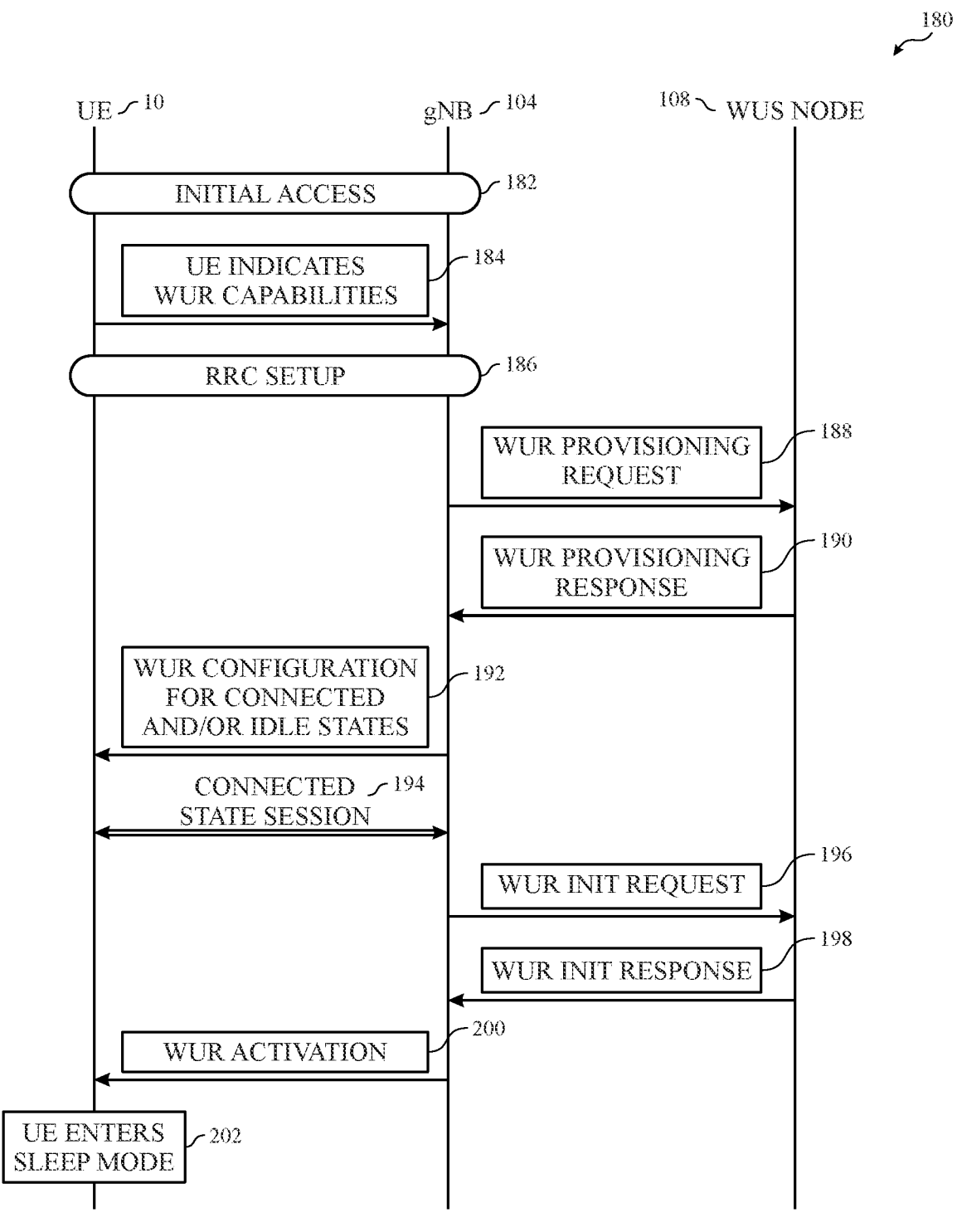
FIG. 9 is a flowchart of a method for activating the wake-up signal receiver of FIG. 5 when the user equipment is in a connected state, according to embodiments of the present disclosure.

FIG. 9 is a flowchart of a method 180 for activating the wake-up signal receiver 56 of the user equipment 10 when the user equipment 10 is in a connected state, according to embodiments of the present disclosure. Any suitable device (e.g., a controller) that may control components of the user equipment (UE) 10, the cellular network 103, the base stations (e.g., gNBs) 104, the wake-up signal (WUS) network 106, and/or the wake-up signal nodes 108, such as the processor 12, may perform the method 180. In some embodiments, the method 180 may be implemented by executing instructions stored in a tangible, non-transitory, computer-readable medium, such as the memory 14 or storage 16, using the processor 12. For example, the method 180 may be performed at least in part by one or more software components, such as an operating system of the user equipment 10, the cellular network 103, the base stations 104, the wake-up signal network 106, and/or the wake-up signal nodes 108, one or more software applications of the user equipment 10, the network 103, the base stations 104, the wake-up signal network 106, and/or the wake-up signal nodes 108, and the like. While the method 180 is described using steps in a specific sequence, it should be understood that the present disclosure contemplates that the described steps may be performed in different sequences than the sequence illustrated, and certain described steps may be skipped or not performed altogether.

Additionally, it should be understood that signal transmissions by the user equipment 10, the base station 104, and/or the wake-up signal node 108 may be sent by transmitters 52 of the user equipment 10, the base station 104, and/or the wake-up signal node 108, respectively, and signal receptions by the user equipment 10, the base station 104, and/or the wake-up signal node 108 may be sent by receivers 54 of the user equipment 10, the base station 104, and/or the wake-up signal node 108, respectively. Moreover, the user equipment 10 may receive the wake-up signal 100, sent by the wake-up signal node 108, by the wake-up signal receiver 56.

In process block 182, the user equipment 10 and the base station 104 perform an initial access procedure. For example, the user equipment 10 may detect the base station 104 (e.g., a cell of the base station 104) by receiving a radio frequency (RF) signal when the user equipment 10 enters a coverage area of the base station 104 (e.g., a geographical region for which the base station 104 provides network coverage). The RF signal may include timing alignment information, among other information. The user equipment 10 may then synchronize to the base station 104 (e.g., the cell of base station 104) by aligning its timing with timing alignment information of the base station 104.

In process block 184, the user equipment 10 transmits an indication of capabilities of its wake-up signal receiver 56 to the base station 104. In particular, the user equipment 10 may transmit an indication that it has a wake-up signal receiver 56, operating characteristics of the wake-up signal receiver 56, configuration of the wake-up signal receiver 56, settings of the wake-up signal receiver 56, and so on. For example, the user equipment 10 may transmit an indication of its support of the wake-up signal receiver when operating in a connected state, an idle state, and/or an inactive state. As another example, the user equipment 10 may transmit an indication of its preferred raster density. In process block 186, the user equipment 10 and the base station 104 perform a Radio Resource Control (RRC) setup procedure. In particular, the user equipment 10 may transmit a request to establish an RRC connection with the base station 104, so that the user equipment 10 and the base station 104 may transfer user data, and the base station 104 may establish the RRC connection.

In process block 188, the base station 104 transmits a request for resources for the wake-up signal receiver 56 (e.g., a wake-up signal receiver provisioning request) to the wake-up signal node 108. The resources may include a wake-up signal raster point 134 of a wake-up signal channel 132. The wake-up signal node 108 may then transmit a wake-up signal 100 having a frequency of or centered about the wake-up signal raster point 134, which is intended for the user equipment 10. As such, the wake-up signal receiver provisioning request may include an identifier associated with the user equipment 10 and/or the wake-up signal receiver 56 of the user equipment 10. The wake-up signal network 106 may allocate the resources, or decide not to allocate the resources, to the user equipment 10. In process block 190, the wake-up signal node 108 transmits a response to (e.g., confirming or denying) the request (e.g., a wake-up signal receiver provisioning response) to the base station 104.

In process block 192, the base station 104 transmits one or more configurations for the wake-up signal receiver 56 when the user equipment 10 is in a connected and/or idle state. When in the connected state, the user equipment 10 is connected to and known by the base station 104, and may transmit user data to and receive user data from the base station 104. When in the idle state, the user equipment 10 is not connected to or known by the base station 104, though the user equipment 10 may be connected to or known by the cellular network 103. For example, the user equipment 10 may monitor paging and broadcast channels to maintain connectivity with the network 103, select a new cell as it moves, inform the network 103 of a new area that it enters (e.g., based on broadcast information received from a base station 104), and so on. As such, when in the idle state, the user equipment 10 may not transmit user data to nor receive user data from the base station 104. In some embodiments, the connected and the idle states may be that which is defined in the 5G specification. Additionally or alternatively, the idle state may include an inactive state, in which the user equipment 10 suspends an RRC session after there is no activity for a first period of time from when it was in the active state, prior to moving to the idle state if there is no activity for a second, longer period of time. As such, when in the inactive state, the user equipment 10 may not transmit user data to nor receive user data from the base station 104. In additional or alternative embodiments, the base station 104 may transmit a configuration for the wake-up signal receiver 56 when the user equipment 10 is in the inactive state.

The base station 104 and/or the cellular network 103 may configure the user equipment 10 with wake-up signal receiver configurations that include a wake-up signal frequency band 130, a wake-up signal channel 142, and/or a wake-up signal raster point 134 to facilitate identifying a frequency domain location of the wake-up signal 100 associated with the user equipment 10. As such, the wake-up signal node 108 may broadcast the wake-up signal 100 using or having the wake-up signal frequency band 130, the wake-up signal channel 142, and/or the wake-up signal raster point 134 to ensure that the wake-up signal receiver 56 of the user equipment 10 receives the wake-up signal 100. In another example, the base station 104 and/or the cellular network 103 may configure the user equipment 10 with wake-up signal receiver configurations that include a time trigger or time offset and periodicity to monitor the configured wake-up signal resources. As such, the base station 104 may send an indication of any of these configurations to the wake-up signal node 108.

In process block 194, the user equipment 10 and the base station 104 are in a connected state session. As such, the user equipment 10 may transmit user data to and receive user data from the base station 104. In process block 196, the base station 104 transmits an initialization request for activation of the wake-up signal receiver 56 to the wake-up signal node 108. The base station 104 may transmit this request because it determines that the receiver 54 of the user equipment 10 should enter a power saving mode (e.g., a low power mode, a deactivation mode, a sleep mode, and so on). In some embodiments, the base station 104 may determine that the receiver 54 should enter the power saving mode because it has not been active for a threshold duration of time, has not received signals or user data for a threshold duration of time, and so on. In additional or alternative embodiments, the base station 104 may determine that the receiver 54 should enter the power saving mode because the user equipment 10 has less than a threshold battery or power source life remaining In any of such cases, such conditions for which the base station 104 determines that the receiver 54 should enter the power saving mode, and parameters for the conditions, such as the threshold duration of time or threshold battery or power source life remaining, may be configured by the user equipment 10 (e.g., by a user, by default, by a machine-learning algorithm).

In process block 198, the wake-up signal node 108 transmits an initialization response to the base station 104. That is, the wake-up signal node 108 may indicate to the base station 104 that it has the availability and resources to broadcast a wake-up signal 100 in the future, and, as such, the wake-up signal receiver 56 of the user equipment 10 may be activated. If the wake-up signal node 108 does not have such availability or resources, then it may indicate as such. In process block 200, the base station 104 transmits an indication of activation of the wake-up signal receiver 56 to the user equipment 10. As such, in process block 202, the user equipment 10 enters sleep mode. In particular, the user equipment 10 may at least cause its receiver 54 to enter a power saving or low power mode, and cause its wake-up signal receiver 56 to activate, ready to receive a wake-up signal 100 from the wake-up signal node 108. In this manner, the method 180 may activate the wake-up signal receiver 56 of the user equipment 10 when the user equipment is in a connected state.

Figure 10:
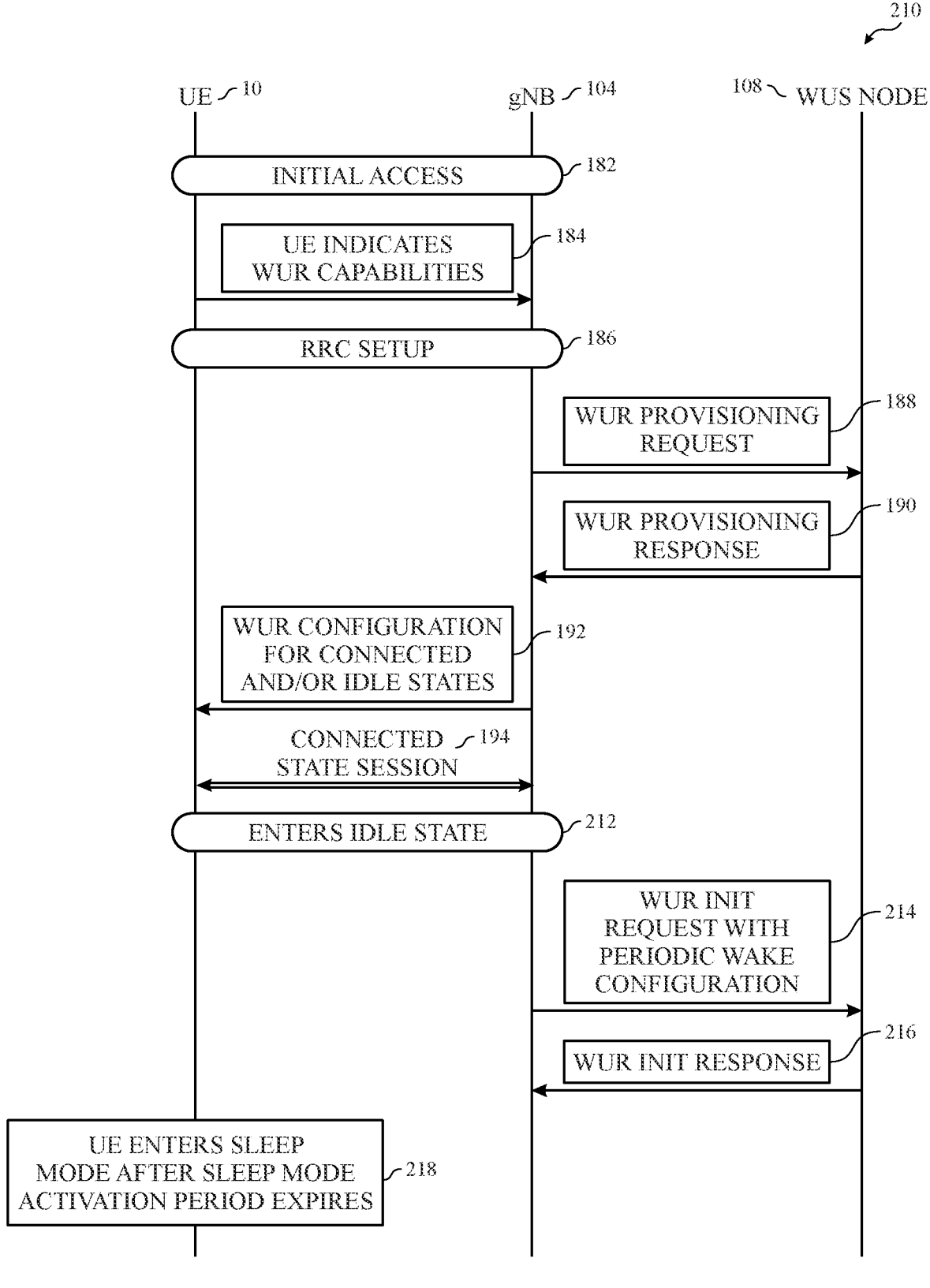
FIG. 10 is a flowchart of a method for activating the wake-up signal receiver of FIG. 5 when the user equipment is in an idle state, according to embodiments of the present disclosure.

FIG. 10 is a flowchart of a method 210 for activating the wake-up signal receiver 56 of the user equipment 10 when the user equipment 10 is in an idle state, according to embodiments of the present disclosure. Any suitable device (e.g., a controller) that may control components of the user equipment (UE) the cellular network 103, the base stations (e.g., gNBs) 104, the wake-up signal (WUS) network 106, and/or the wake-up signal nodes 108, such as the processor 12, may perform the method 210. In some embodiments, the method 210 may be implemented by executing instructions stored in a tangible, non-transitory, computer-readable medium, such as the memory 14 or storage 16, using the processor 12. For example, the method 210 may be performed at least in part by one or more software components, such as an operating system of the user equipment 10, the cellular network 103, the base stations 104, the wake-up signal network 106, and/or the wake-up signal nodes 108, one or more software applications of the user equipment 10, the network 103, the base stations 104, the wake-up signal network 106, and/or the wake-up signal nodes 108, and the like. While the method 210 is described using steps in a specific sequence, it should be understood that the present disclosure contemplates that the described steps may be performed in different sequences than the sequence illustrated, and certain described steps may be skipped or not performed altogether.

Process blocks 182-194 are described above with reference to the method 180 of FIG. 9. In process block 212, the user equipment 10 enters the idle state. In additional or alternative embodiments, the user equipment 10 may enter the inactive state. In either case, the user equipment 10 may deactivate the receiver 54, and, as such, not receive user data from the base station 104. Additionally, the user equipment may activate the wake-up signal receiver 56. In process block 214, the base station 104 transmits an initialization request for activation of the wake-up signal receiver 56 with periodic wake configuration to the wake-up signal node 108. As with the initialization request in process block 196 of FIG. 9, the base station 104 may transmit this request because it determines that the receiver 54 of the user equipment 10 should enter a power saving mode (e.g., a low power mode, a deactivation mode, a sleep mode, and so on). In particular, the base station 104 may determine that the receiver 54 should enter the power saving mode as it has entered the idle state (or the inactive state). In additional or alternative embodiments, the base station 104 may determine that the receiver 54 should enter the power saving mode because the user equipment 10 has been in the idle state (or the inactive state) for a threshold period of time. In any of such cases, such conditions for which the base station 104 determines that the receiver 54 should enter the power saving mode, and parameters for the conditions, such as the state in which the user equipment 10 is operating or the threshold period of time, may be configured by the user equipment 10 (e.g., by a user, by default, by a machine-learning algorithm). The periodic wake configuration may cause the wake-up signal node 108 to broadcast a wake-up signal 100 with a certain periodicity (e.g., every 1 millisecond (ms) or less, every 10 ms or less, every 100 ms or less, every 1 second or less, every 10 seconds or less, every 1 minute or less, every 10 minutes or less, every 10 minutes or more, and so on), which may be determined by the wake-up signal network 106, the cellular network 103, and/or the user equipment 10, to ensure that the user equipment 10 receives the wake-up signal 100. Moreover, with the periodic wake configuration, the wake-up signal node 108 may initiate broadcasting the wake-up signal 100 itself, as opposed to first receiving a wake-up signal receiver wake request signal from the base station 104, and broadcasting the wake-up signal 100 in response to receiving the wake-up signal receiver wake request signal.

It should be understood that the periodic wake configuration is included as an example embodiment, and, in additional or alternative embodiments, the base station 104 may transmit the initialization request for activation of the wake-up signal receiver 56 without the periodic wake configuration, similar to process block 196 of FIG. 9. Similarly, instead of transmitting the initialization request for activation of the wake-up signal receiver 56 without the periodic wake configuration, the process block 196 of the method 180 of FIG. 9 may transmit the initialization request for activation of the wake-up signal receiver 56 with the periodic wake configuration, as described in the process block 214 of FIG. 10. In process block 216, the wake-up signal node 108 transmits an initialization response to the base station 104. That is, the wake-up signal node 108 may indicate to the base station 104 that it has the availability and resources to broadcast wake-up signals 100 with the periodic wake configuration in the future, and, as such, the wake-up signal receiver 56 of the user equipment 10 may be activated. If the wake-up signal node 108 does not have such availability or resources, then it may indicate as such.

In process block 218, the user equipment 10 enters sleep mode after a sleep mode activation period expires. That is, after the sleep mode activation period, which may be any suitable amount of time after the user equipment enters the idle mode (e.g., 1 second or more, 10 seconds or more 30 seconds or more, 1 minute or more, 5 minutes or more 10 minutes or more, and so on), the user equipment 10 may enter the sleep mode. In particular, the user equipment 10 may at least cause its receiver 54 to enter a power saving or low power mode, and cause its wake-up signal receiver 56 to activate, ready to receive a wake-up signal 100 from the wake-up signal node 108. It should be understood that the base station 104 may not transmit the indication of activation of the wake-up signal receiver 56 to the user equipment 10 as shown in process block 200 of FIG. 9 to cause the user equipment 10 to enter the sleep mode, as the user equipment is already in the idle state, and may not receive such an indication. In this manner, the method 210 may activate the wake-up signal receiver 56 of the user equipment 10 when the user equipment 10 is in an idle state.

Figure 11:
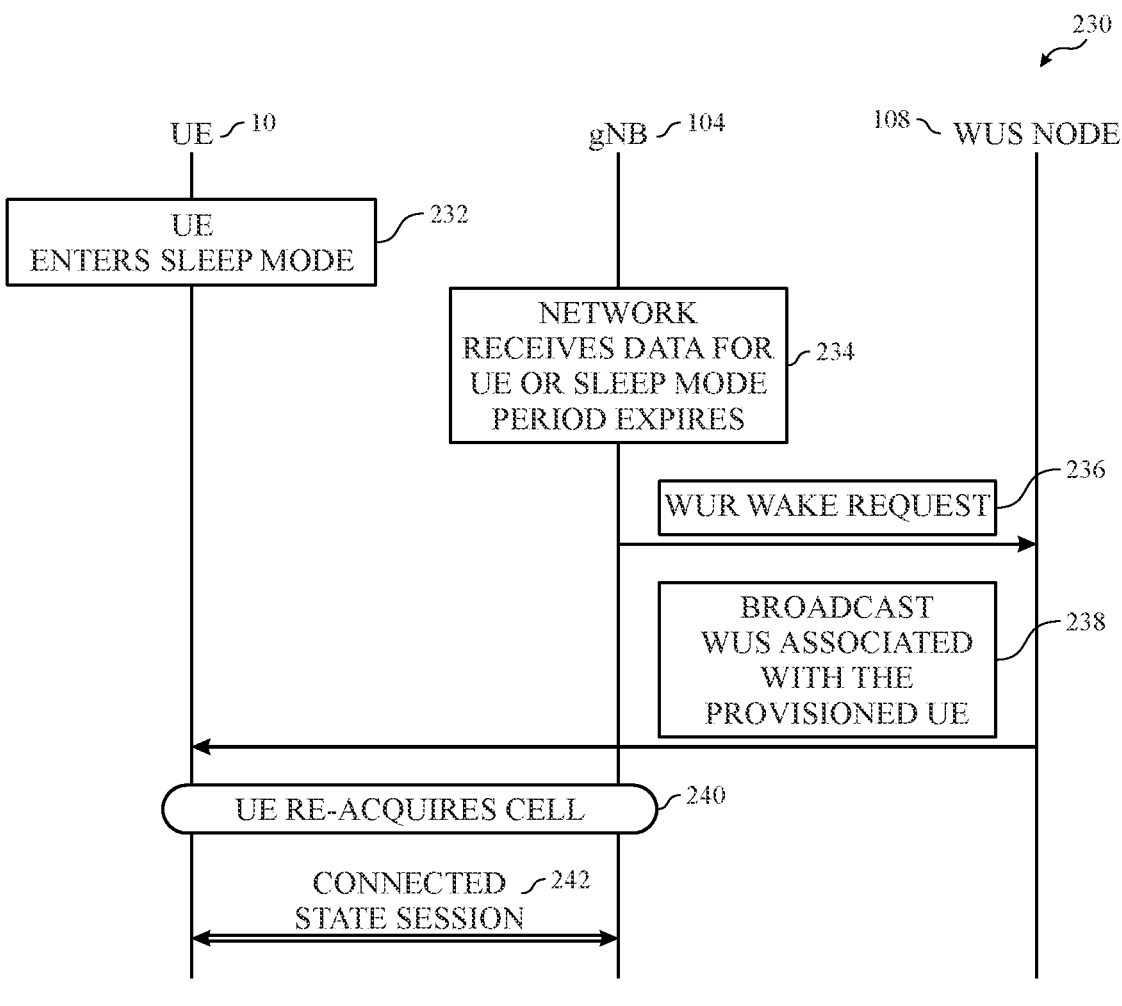
FIG. 11 is a flowchart of a method for activating the cellular receiver of FIG. 4 in response to receiving a wake-up signal based on the base station causing the wake-up signal node of FIG. 6 to broadcast a wake-up signal, according to embodiments of the present disclosure.

With the wake-up signal receiver 56 activated and the cellular receiver 54 deactivated (e.g., or in a low power mode), the user equipment 10 may activate its cellular receiver 54 to receive wireless signals (e.g., user data) from the base station 104 in response to receiving the wake-up signal 100 from the wake-up signal node 108, or on its own accord. FIG. 11 is a flowchart of a method 230 for activating the cellular receiver 54 in response to receiving a wake-up signal 100 based on the base station 104 causing the wake-up signal node 108 to broadcast the wake-up signal 100, according to embodiments of the present disclosure. Any suitable device (e.g., a controller) that may control components of the user equipment (UE) the cellular network 103, the base stations (e.g., gNBs) 104, the wake-up signal (WUS) network 106, and/or the wake-up signal nodes 108, such as the processor 12, may perform the method 230. In some embodiments, the method 230 may be implemented by executing instructions stored in a tangible, non-transitory, computer-readable medium, such as the memory 14 or storage 16, using the processor 12. For example, the method 230 may be performed at least in part by one or more software components, such as an operating system of the user equipment 10, the cellular network 103, the base stations 104, the wake-up signal network 106, and/or the wake-up signal nodes 108, one or more software applications of the user equipment 10, the network 103, the base stations 104, the wake-up signal network 106, and/or the wake-up signal nodes 108, and the like. While the method 230 is described using steps in a specific sequence, it should be understood that the present disclosure contemplates that the described steps may be performed in different sequences than the sequence illustrated, and certain described steps may be skipped or not performed altogether.

In process block 232, the user equipment enters sleep mode, as described in process block 202 of the method 180 of FIG. 9 or process block 218 of the method 210 of FIG. 10. That is, the user equipment has accessed a cell 120 of a base station 104 and provided its wake-up signal receiver capabilities to the base station 104, the base station 104 and the wake-up signal node 108 have exchanged wake-up signal receiver provisioning, and the wake-up signal receiver 56 has been activated (e.g., while the user equipment was in the connected state as described in the method 180 of FIG. 9 or while the user equipment 10 was in the idle state as described in the method 210 of FIG. 10).

In process block 234, the base station 104 and/or the cellular network 103 receives data (e.g., user data) that is to be transmitted to the user equipment 10 or determines that a sleep mode of the user equipment 10 has expired. For example, another device (e.g., user equipment or computing device of the cellular network 103) may transmit the data, targeting the user equipment 10 as a destination. As another example, when the user equipment 10 enters the sleep mode in process block 232, the base station 104 and/or the cellular network 103 may initiate a timer. Once the timer reaches a threshold expiration time (e.g., 5 seconds or less, 10 seconds or less, 1 minute or less, 5 minutes or less, 10 minutes or less, 10 minutes or more, and so on), the base station 104 and/or the cellular network 103 may determine that the user equipment 10 should exit the sleep mode.

In process block 236, the base station 104 transmits a wake-up signal receiver wake request to the wake-up signal node 108. The wake-up signal receiver wake request may cause the wake-up signal node 108 to broadcast a wake-up signal 100 targeting the user equipment 10. As such, the wake-up signal receiver wake request may include an identifier associated with the user equipment 10 and/or the wake-up signal receiver 56 of the user equipment 10. In process block 238, the wake-up signal node 108 broadcasts the wake-up signal 100 targeting the user equipment 10. Accordingly, the wake-up signal 100 may include an identifier corresponding to wake-up signal 100 targeting the user equipment 10. Any user equipment within a cell 122 of the wake-up signal node 108 may receive the broadcast signal, though only the wake-up signal receiver 56 of the user equipment 10 corresponding to the identifier in the wake-up signal 100 may activate or wake up the cellular receiver 54 in the user equipment 10.

In process block 240, the wake-up signal receiver 56 activates the receiver 54 in the user equipment 10, and may deactivate the wake-up signal receiver 56. That is, the receiver 54 and/or the user equipment 10 exits the sleep or power saving mode. The user equipment 10 then reacquires the cell 120 of or reconnects with the base station 104 (or another cell 120 of another base station 104 if, for example, the other cell 120 has better signal characteristics (e.g., power and/or quality) or if the user equipment 10 has moved to another cell 120) using the receiver 54. In process block 242, the user equipment 10 and the base station 104 enter the connected state session, in which the user equipment 10 and the base station 104 may exchange data (e.g., user data), including data intended for the user equipment 10 as referenced in process block 234. In this manner, the method 230 activates the cellular receiver 54 in response to receiving a wake-up signal 100 based on the base station 104 causing the wake-up signal node 108 to broadcast the wake-up signal 100.

Figure 12:
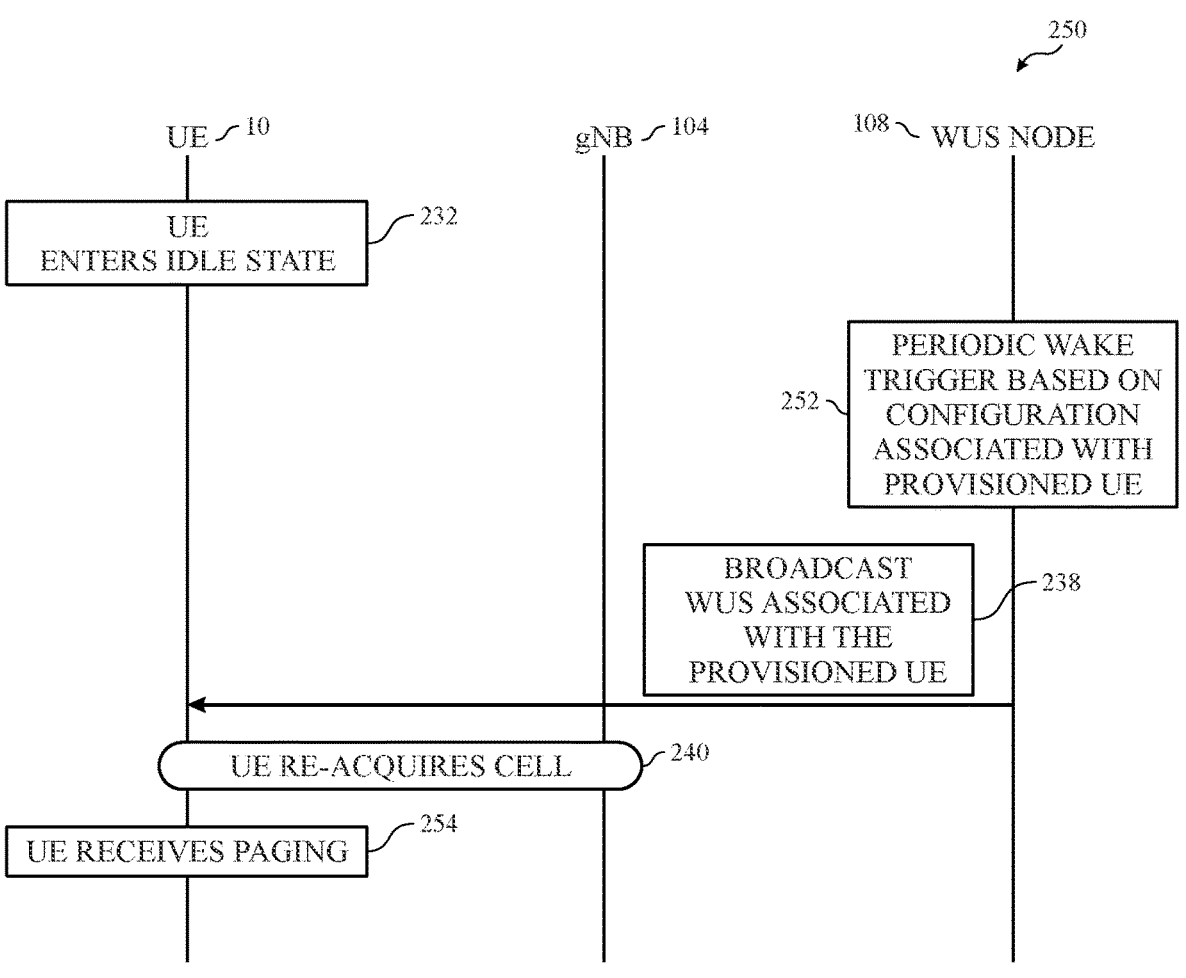
FIG. 12 is a flowchart of a method for activating the cellular receiver of FIG. 4 in response to receiving a wake-up signal based on the wake-up signal node of FIG. 6 initiating a broadcast of the wake-up signal, according to embodiments of the present disclosure.

FIG. 12 is a flowchart of a method 250 for activating the cellular receiver 54 in response to receiving a wake-up signal 100 based on the wake-up signal node 108 initiating a broadcast of the wake-up signal 100, according to embodiments of the present disclosure. Any suitable device (e.g., a controller) that may control components of the user equipment (UE) 10, the cellular network 103, the base stations (e.g., gNBs) 104, the wake-up signal (WUS) network 106, and/or the wake-up signal nodes 108, such as the processor 12, may perform the method 250. In some embodiments, the method 250 may be implemented by executing instructions stored in a tangible, non-transitory, computer-readable medium, such as the memory 14 or storage 16, using the processor 12. For example, the method 250 may be performed at least in part by one or more software components, such as an operating system of the user equipment 10, the cellular network 103, the base stations 104, the wake-up signal network 106, and/or the wake-up signal nodes 108, one or more software applications of the user equipment 10, the network 103, the base stations 104, the wake-up signal network 106, and/or the wake-up signal nodes 108, and the like. While the method 250 is described using steps in a specific sequence, it should be understood that the present disclosure contemplates that the described steps may be performed in different sequences than the sequence illustrated, and certain described steps may be skipped or not performed altogether.

In process block 232, the user equipment enters sleep mode, as described in process block 202 of the method 180 of FIG. 9 or process block 218 of the method 210 of FIG. 10. In process block 252, the wake-up signal node 108 performs a periodic wake trigger based on a configuration associated with the user equipment 10. For example, in the capabilities of the wake-up signal receiver 56 sent by the user equipment 10 to the base station 104 as described in process block 184 of FIG. 9 or 10, and/or in the wake-up signal receiver provisioning request sent by the base station 104 to the wake-up signal node 108 as described in process block 188 of FIG. 9 or 10, the wake-up signal node 108 may receive a configuration of the periodic wake trigger associated with the user equipment 10. The configuration may include a periodicity (e.g., every 1 millisecond (ms) or less, every 10 ms or less, every 100 ms or less, every 1 second or less, every 10 seconds or less, every 1 minute or less, every 10 minutes or less, every 10 minutes or more, and so on) to perform the wake trigger and/or other parameters of the wake trigger. The wake trigger may cause the wake-up signal node 108 to broadcast the wake-up signal 100 targeting the user equipment 10.

As such, in process block 238, the wake-up signal node 108 broadcasts the wake-up signal 100 targeting the user equipment 10. In process block 240, the wake-up signal receiver 56 activates the receiver 54 in the user equipment 10, and may deactivate the wake-up signal receiver 56. That is, the receiver 54 and/or the user equipment 10 exits the sleep or power saving mode. The user equipment 10 then reacquires the cell 120 of the base station 104 (or another cell 120 of another base station 104 if, for example, the other cell 120 has better signal characteristics (e.g., power and/or quality) or if the user equipment 10 has moved to another cell 120) using the receiver 54. In process block 254, the user equipment 10 receives paging from the base station 104. For example, the paging may include a request, message, and/or content from the base station 104 and/or cellular network 103 targeting or addressing the user equipment 10. It should be understood that the paging is included as an example, and in additional or alternative embodiments, process block 254 may instead include a connected state session, such as that described in process block 242 of FIG. 11. Similarly, process block 242 of FIG. 11 may instead include the user equipment 10 receiving paging, as described in process block 254. In this manner, the method 250 activates the cellular receiver 54 in response to receiving a wake-up signal 100 based on the wake-up signal node 108 initiating a broadcast of the wake-up signal 100.

Figure 13:
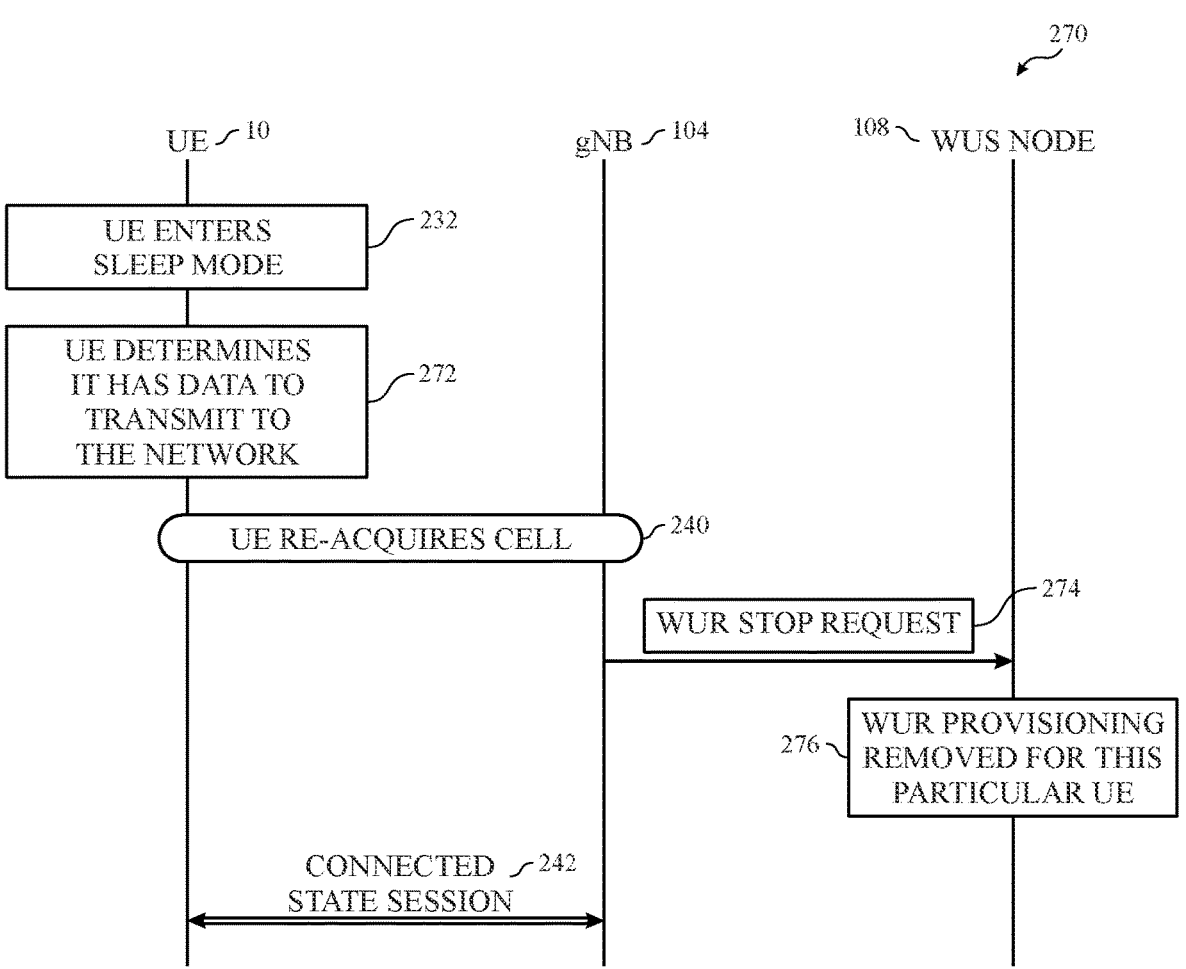
FIG. 13 is a flowchart of a method for the user equipment of FIG. 1 to activate the cellular receiver of FIG. 4 when the wake-up signal receiver of FIG. 5 is activated, according to embodiments of the present disclosure.

FIG. 13 is a flowchart of a method 270 for the user equipment 10 to activate the cellular receiver 54 when the wake-up signal receiver 56 is activated, according to embodiments of the present disclosure. Any suitable device (e.g., a controller) that may control components of the user equipment (UE) 10, the cellular network 103, the base stations (e.g., gNBs) 104, the wake-up signal (WUS) network 106, and/or the wake-up signal nodes 108, such as the processor 12, may perform the method 270. In some embodiments, the method 270 may be implemented by executing instructions stored in a tangible, non-transitory, computer-readable medium, such as the memory 14 or storage 16, using the processor 12. For example, the method 270 may be performed at least in part by one or more software components, such as an operating system of the user equipment 10, the cellular network 103, the base stations 104, the wake-up signal network 106, and/or the wake-up signal nodes 108, one or more software applications of the user equipment 10, the network 103, the base stations 104, the wake-up signal network 106, and/or the wake-up signal nodes 108, and the like. While the method 270 is described using steps in a specific sequence, it should be understood that the present disclosure contemplates that the described steps may be performed in different sequences than the sequence illustrated, and certain described steps may be skipped or not performed altogether.

In process block 232, the user equipment enters sleep mode, as described in process block 202 of the method 180 of FIG. 9 or process block 218 of the method 210 of FIG. 10. In process block 272, the user equipment 10 determines it has data (e.g., user data) to transmit to the cellular network 103. For example, the user equipment 10 may determine it has to upload data to a website or database, send a message (e.g., an e-mail, Short Message Service (SMS) text message), make a voice call, and so on. In process block 240, the user equipment 10 activates its cellular receiver 54, and may deactivate the wake-up signal receiver 56. The user equipment 10 then reacquires the cell 120 of the base station 104 (or another cell 120 of another base station 104 if, for example, the other cell 120 has better signal characteristics (e.g., power and/or quality) or if the user equipment 10 has moved to another cell 120) using the receiver 54.

The base station 104 receives an indication of the user equipment 10 reacquiring its cell 120, and, in process block 274, transmits a wake-up signal receiver stop request to the wake-up signal node 108. That is, because the user equipment has activated its cellular receiver 54 and deactivated its wake-up signal receiver 56, the base station 104 informs the wake-up signal node 108 that a wake-up signal 100 is no longer necessary. The wake-up signal receiver stop request may include an identifier associated with the user equipment 10 and/or the wake-up signal receiver 56 of the user equipment 10. In response to receiving the wake-up signal receiver stop request, in process block 276, the wake-up signal node 108 removes provisioning for the user equipment 10. That is, it de-allocates or releases the wake-up signal raster point 134 of a wake-up signal channel 132 assigned to the user equipment 10. In this manner, the method 270 enables the user equipment 10 to activate its cellular receiver 54 when the wake-up signal receiver 56 is activated.

In embodiments where the cellular network 103 may communicate with the wake-up signal network 106 (such as when they share an operator), this relationship may be leveraged to enable better and more efficient communication. For example, when the user equipment 10 is in the inactive state, a Radio Access Network (RAN) (e.g., including the base stations and/or the cellular network 103) may have received a context of the user equipment 10, and, as such, the RAN may know that the user equipment 10 is configured with a wake-up signal receiver 56, and thus may know that wake-up signal paging may be used to communicate with the user equipment 10. As such, the RAN may transmit signals to or receive signals from the user equipment 10 when it is in the inactive state, via the wake-up signal network 106. As another example, when the user equipment 10 is in the idle state, the user equipment 10 context may be received by a core network (e.g., including the cellular network 103), though may not be received by the RAN. As such, when paging is initiated by the core network), the core network should know whether cellular paging or wake-up signal paging should be used to indicate paging information to the RAN and/or the wake-up signal node 108 that may transmit a paging message.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. User equipment, comprising:
a cellular transmitter;
a cellular receiver;
a wake-up signal receiver; and
processing circuitry communicatively coupled to the cellular transmitter, the cellular receiver, and the wake-up signal receiver, the processing circuitry configured to
cause the cellular transmitter to transmit an indication of the wake-up signal receiver to a base station via a first network,
deactivate the cellular receiver and activate the wake-up signal receiver,
cause the wake-up signal receiver to receive a wake-up signal from a wake-up signal node via a second network, activate the cellular receiver and deactivate the wake-up signal receiver based on the wake-up signal, and cause the cellular receiver to receive a cellular signal from the base station via the first network.

2. The user equipment of claim 1, wherein the processing circuitry is configured to cause the cellular receiver to receive a wake-up signal receiver activation signal from the base station via the first network, and deactivate the cellular receiver and activate the wake-up signal receiver based on the wake-up signal receiver activation signal.

3. The user equipment of claim 1, wherein the processing circuitry is configured to enter an idle state by deactivating the cellular receiver and activating the wake-up signal receiver.

4. The user equipment of claim 1, wherein the cellular signal comprises a first frequency in a first frequency range, and the wake-up signal comprises a second frequency in a second frequency range, the second frequency range not overlapping with the first frequency range.

5. The user equipment of claim 1, wherein the processing circuitry is configured to select a first wake-up signal node for coverage of the second network, determine that the coverage of the second network provided by the first wake-up signal node is lost, and select a second wake-up signal node for the coverage of the second network, the wake-up signal being received from the second wake-up signal node via the second network.

6. The user equipment of claim 1, wherein the processing circuitry is configured to select the wake-up signal node for coverage of the second network, determine that the coverage of the second network provided by the wake-up signal node is lost, and activate the cellular receiver and deactivate the wake-up signal receiver to perform cellular paging or activate the cellular transmitter and deactivate the wake-up signal receiver to transmit an indication of the cellular paging via the first network.

7. A method, comprising:
receiving, at a base station, an indication of a wake-up signal receiver from user equipment via a first network comprising the user equipment;
transmitting, by the base station, a provisioning request for the wake-up signal receiver to a wake-up signal node via a second network comprising the wake-up signal node;
transmitting, by the base station, a wake-up signal receiver initiation request to the wake-up signal node via the first network to cause the wake-up signal node to broadcast a wake-up signal to the user equipment while the user equipment is in a power saving mode;
receiving, by the base station, an indication that the user equipment has reconnected to the base station based on the user equipment exiting the power saving mode via the first network; and
transmitting, by the base station, data to or receiving, by the base station, data from the user equipment via the first network.

8. The method of claim 7, wherein the indication of the wake-up signal receiver comprises one or more capabilities of the wake-up signal receiver.

9. The method of claim 8, wherein the one or more capabilities of the wake-up signal receiver comprise an indication of support of the wake-up signal receiver when the user equipment is operating in a connected state, support of the wake-up signal receiver when the user equipment is operating in an idle state, support of the wake-up signal receiver when the user equipment is operating in an inactive state, or any combination thereof.

10. The method of claim 8, wherein the one or more capabilities of the wake-up signal receiver comprise an indication of a preferred raster density.

11. The method of claim 7, comprising transmitting, by the base station, a wake-up signal receiver activation signal to the user equipment via the first network, the wake-up signal receiver activation signal causing the user equipment to enter the power saving mode.

12. The method of claim 7, comprising transmitting, by the base station, the provisioning request via the second network when the base station is in a connected state with the user equipment.

13. The method of claim 7, comprising transmitting, by the base station, the provisioning request via the second network based on the user equipment being in an idle state.

14. The method of claim 7, comprising receiving, by the base station, a provisioning response from the wake-up signal receiver via the second network based on the provisioning request.

15. The method of claim 14, comprising transmitting, by the base station, one or more configurations for the wake-up signal receiver via the second network based on the provisioning response.

16. The method of claim 7, comprising transmitting, by the base station, the wake-up signal receiver initiation request based on determining that the user equipment is to enter the power saving mode.

17. One or more tangible, non-transitory, machine-readable media, storing instructions configured to cause processing circuitry of a wake-up signal node to:

receive a provisioning request from a base station for user equipment;

allocate resources to the user equipment based on the provisioning request;

receive an initialization request from the base station to activate a wake-up signal receiver of the user equipment;

transmit, to the base station, an indication of resource availability to broadcast a wake-up signal to the user equipment based on the initialization request; and broadcast the wake-up signal to the user equipment.

18. The one or more tangible, non-transitory, machine-readable media of claim 17, wherein the resources comprise a frequency associated with the wake-up signal.

19. The one or more tangible, non-transitory, machine-readable media of claim 17, wherein the initialization request is received from the base station.

20. The one or more tangible, non-transitory, machine-readable media of claim 17, wherein the initialization request is periodically received based on a configuration associated with the user equipment.

* * * * *